US009979755B2

(12) United States Patent
Ilagan

(10) Patent No.: US 9,979,755 B2
(45) Date of Patent: May 22, 2018

(54) SYSTEM AND METHOD FOR ROUTING CUSTOMER SUPPORT SOFTPHONE CALL

(75) Inventor: Oliver Ilagan, Nashville, TN (US)

(73) Assignee: DELL PRODUCTS, LP, Round Rock, TX (US)

(*) Notice: Subject to any disclaimer, the term of this patent is extended or adjusted under 35 U.S.C. 154(b) by 1545 days.

(21) Appl. No.: 13/164,135

(22) Filed: Jun. 20, 2011

(65) Prior Publication Data
US 2012/0320905 A1 Dec. 20, 2012

(51) Int. Cl.
H04L 12/66 (2006.01)
H04L 29/06 (2006.01)
H04M 3/51 (2006.01)

(52) U.S. Cl.
CPC ...... H04L 65/1069 (2013.01); H04L 65/4023 (2013.01); H04M 3/5191 (2013.01)

(58) Field of Classification Search
CPC .................... H04M 3/5191; H04M 3/5183
USPC ............... 709/203, 204, 207; 370/401, 352; 379/202.01, 93.01; 715/736; 455/566; 704/275
See application file for complete search history.

(56) References Cited

U.S. PATENT DOCUMENTS

| 6,038,597 | A | 3/2000 | Van Wyngarden | |
|---|---|---|---|---|
| 6,493,695 | B1 * | 12/2002 | Pickering et al. | 706/47 |
| 6,594,357 | B1 * | 7/2003 | Emerson et al. | 379/265.04 |
| 6,938,257 | B1 * | 8/2005 | Rapp et al. | 719/311 |
| 7,194,531 | B2 * | 3/2007 | Donker et al. | 709/223 |
| 7,362,702 | B2 | 4/2008 | Terrell et al. | |
| 7,739,329 | B2 * | 6/2010 | Thompson | 709/203 |
| 8,239,206 | B1 * | 8/2012 | LeBeau et al. | 704/275 |
| 2001/0026609 | A1 * | 10/2001 | Weinstein et al. | 379/93.01 |
| 2001/0046887 | A1 * | 11/2001 | Yamaoka | 455/569 |
| 2003/0043780 | A1 * | 3/2003 | Rowan et al. | 370/352 |
| 2003/0056000 | A1 | 3/2003 | Mullendore et al. | |
| 2003/0065779 | A1 * | 4/2003 | Malik et al. | 709/225 |
| 2003/0074230 | A1 | 4/2003 | Merkin et al. | |
| 2004/0039775 | A1 * | 2/2004 | Yoshida et al. | 709/203 |
| 2004/0184470 | A1 | 9/2004 | Holden | |
| 2004/0236582 | A1 * | 11/2004 | Yoshikai et al. | 704/278 |
| 2004/0258048 | A1 | 12/2004 | Melideo | |
| 2005/0138183 | A1 * | 6/2005 | O'Rourke et al. | 709/228 |
| 2006/0020670 | A1 * | 1/2006 | Anderson | 709/206 |
| 2006/0088041 | A1 * | 4/2006 | Rockett | 370/401 |
| 2008/0034052 | A1 * | 2/2008 | Bess et al. | 709/207 |
| 2008/0255977 | A1 * | 10/2008 | Altberg et al. | 705/35 |
| 2008/0281915 | A1 * | 11/2008 | Elad et al. | 709/204 |
| 2009/0160802 | A1 * | 6/2009 | Yasumi | 345/173 |
| 2009/0220064 | A1 * | 9/2009 | Gorti et al. | 379/202.01 |
| 2009/0252302 | A1 | 10/2009 | Monroe | |
| 2009/0274141 | A1 | 11/2009 | Kanai | |
| 2010/0002685 | A1 * | 1/2010 | Shaham et al. | 370/352 |
| 2010/0069114 | A1 * | 3/2010 | Lee et al. | 455/556.1 |
| 2010/0199189 | A1 * | 8/2010 | Ben-Aroya et al. | 715/736 |
| 2011/0096919 | A1 * | 4/2011 | Daye et al. | 379/265.12 |

(Continued)

Primary Examiner — Parth Patel
(74) Attorney, Agent, or Firm — Larson Newman, LLP

(57) ABSTRACT

A method of routing a voice communication from a web page to one of a plurality of queues includes determining a plurality of variables for routing the voice communication, and assigning a default value to each variable for the web page so that the voice communication can be routed to one of the queues regardless of whether the first value has been ascertained.

8 Claims, 9 Drawing Sheets

(56) References Cited

U.S. PATENT DOCUMENTS

2011/0103377 A1    5/2011   Hua et al.
2011/0275412 A1*  11/2011   Khawand ..................... 455/566

* cited by examiner

| Routing Variables | Values |
|---|---|
| Unique Identifer | ### Unset |
| Caller Type | Business Consumer Unset |
| Product | Desktop PC Notebook PC Television Unset |
| Issue Category | Sales Lease Order Status Unset |
| ⋮ | |
| Region | North America Canada EU Unset |

*FIG. 4*

SYSTEM AND METHOD FOR ROUTING CUSTOMER SUPPORT SOFTPHONE CALL

CROSS REFERENCE TO RELATED APPLICATIONS

Related subject matter is contained in the following co-pending applications:

U.S. application Ser. No. 13/164,133, filed Jun. 20, 2011, entitled "System and Method for Device Specific Customer Support" invented by Oliver Ilagan, and assigned to the assignee hereof.

U.S. application Ser. No. 13/164,134, filed Jun. 20, 2011, entitled "Customer Support System and Method Therefor," invented by Oliver Ilagan, and assigned to the assignee hereof.

FIELD OF THE DISCLOSURE

This disclosure generally relates to information handling systems, and more particularly relates to a system and a method for providing customer support using an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. Information handling systems and associated software applications play a central role in nearly every aspect of commerce, from research and development to sales and marketing.

BRIEF DESCRIPTION OF THE DRAWINGS

Embodiments incorporating teachings of the present disclosure are shown and described with respect to the drawings presented herein, in which:

FIG. 4 is a table illustrating information that the system of FIG. 1 can use to select an appropriate service representative queue in a specific embodiment of the present disclosure;

The use of the same reference symbols in different drawings indicates similar or identical items.

DETAILED DESCRIPTION

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
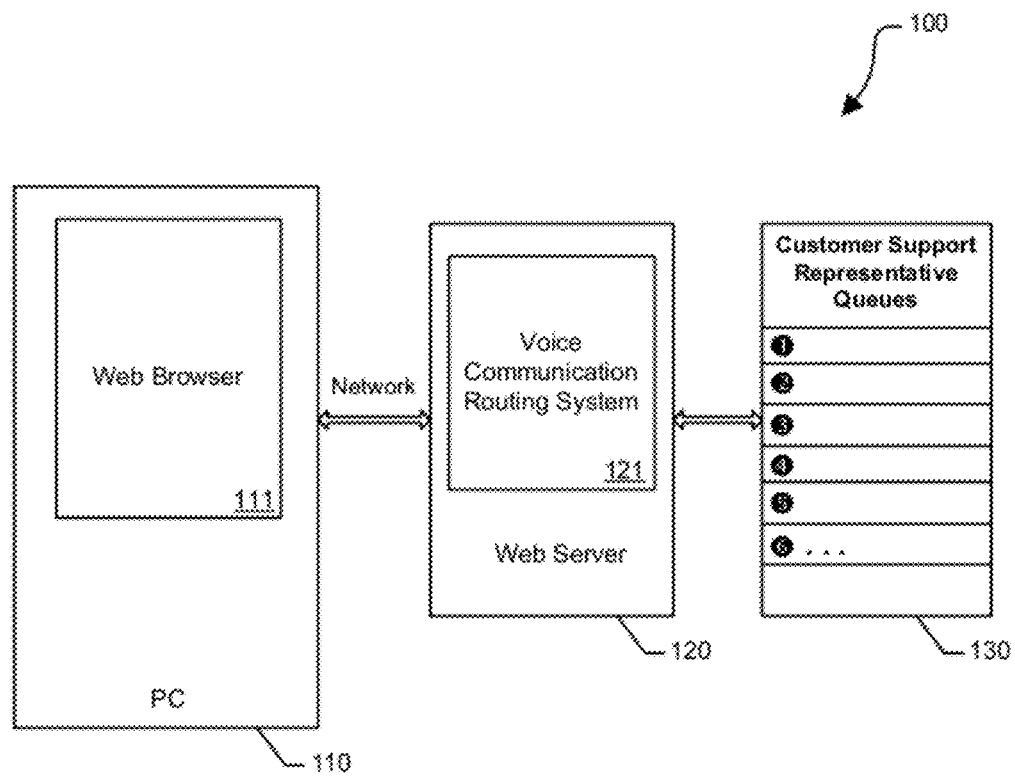
FIG. 1 is a block diagram illustrating a system for providing customer support using an information handling system in accordance with a specific embodiment of the present disclosure.

FIG. 1 shows a system 100 for providing customer support using an information handling system in accordance with the present disclosure. System 100 includes an information handling system such as a personal computer 110, connected via a network such as the Internet to a server 120. The personal computer 110 is configured to provide an Internet web browser 111 with which a user of the personal computer can navigate to and interact with a web site served by the web server 120. The web browser 111 is also configured to display a softphone application shown in FIG. 2. The web server 120 includes a voice communication routing system 121 that is configured to route softphone calls initiated by users of the personal computers 110 to a respective preferred one of customer support representative queues 130. The voice communication routing system 121 is configured to determine strategic information about the user who is navigating the web site provided by the web server 120. In particular, the voice communication routing system can determine aspects of the user's intentions and route the user to an appropriate customer support representative queue based on the acquired information. Moreover, some or all of the information that is used to select the preferred representative queue can be automatically determined by the voice communication routing system 121 without directly querying the user for specific information. Information handling system 110 can include a cellular smartphone, a personal digital assistance (PDA), a tablet computer, an e-book, or another type of device such as an Internet-connected device.

The information handling system can also include a television device operable to communicate with a server, such as the web server 120.

Systems and methods disclosed herein can improve the quality of customer service and thereby improve the customer's experience when interacting with a business. In an embodiment, Voice over Internet Protocol (VoIP) technology combined with a client based softphone application allows a customer to speak with a customer support representative using their personal computer or another type of device. In particular, a customer's call can be routed to a preferred customer support representative queue based fully or in part on information derived automatically by a voice communication routing system. In an embodiment, the interest or intent of a customer may be automatically derived based on a particular website page to which the customer has navigated. In another embodiment, customer or product information can be obtained from the customer's computer system and an appropriate customer service representative queue can be selected based on this information. In still another embodiment, a customer who is browsing a web page may be conditionally presented with a graphical "Call Now" button based on information acquired by the voice communication routing system 121. For example, display of a Call Now button can be suppressed until sufficient information about the customer's intent has been determined. In response to pressing the Call Now button, the softphone application can be launched at the customer's information handling system to allow the customer to speak directly with a support representative automatically selected by the voice communication routing system 121. While the systems and techniques disclosed herein are ideally suited for supporting interactions between an organization and its current or prospective customers, they can be applied equally well to any organization or individual wishing to provide access to a live support staff. For simplicity, these techniques are described in the context of a technology product supply company providing call center customer support services.

The voice communication routing system 121 disclosed herein is configured to route calls from individuals to specific support representative queues or support personnel based on a variety of routing criteria. The number and scope of the specific criteria can be selected based on the type of organization offering the customer support, the type of product or service being supported, the type of customer, and the like. For example, the routing system 121 can determine that a customer possesses a service agreement, a warranty, and the like, and route the call accordingly. In another embodiment, a call can be routed to a service queue having escalated priority based on information determined by the routing system 121. For example, queues providing specialized or premium support capabilities can be selected based on a customer's sales volume, account balance, contractual obligations, and the like. Routing criteria can be represented by one or more routing variables. In an embodiment, routing variables include a variable name and one or more values that can be exclusively associated with the variable. For example, a variable name may be "customer-type," and the customer-type variable name can be associated with values including "business," "consumer," "government," and the like. In addition, each variable may include a default value, and may further include an "unset" value. In an embodiment, a variable name and a corresponding value can be stored in the form of a name-value pair. For example, the name-value pair "customer-type=consumer" indicates that the variable "customer-type" is associated with the value "consumer." In an embodiment, the voice communication routing system can route softphone calls to a preferred support representative queue based on one or more name-value pairs.

Figure 2:
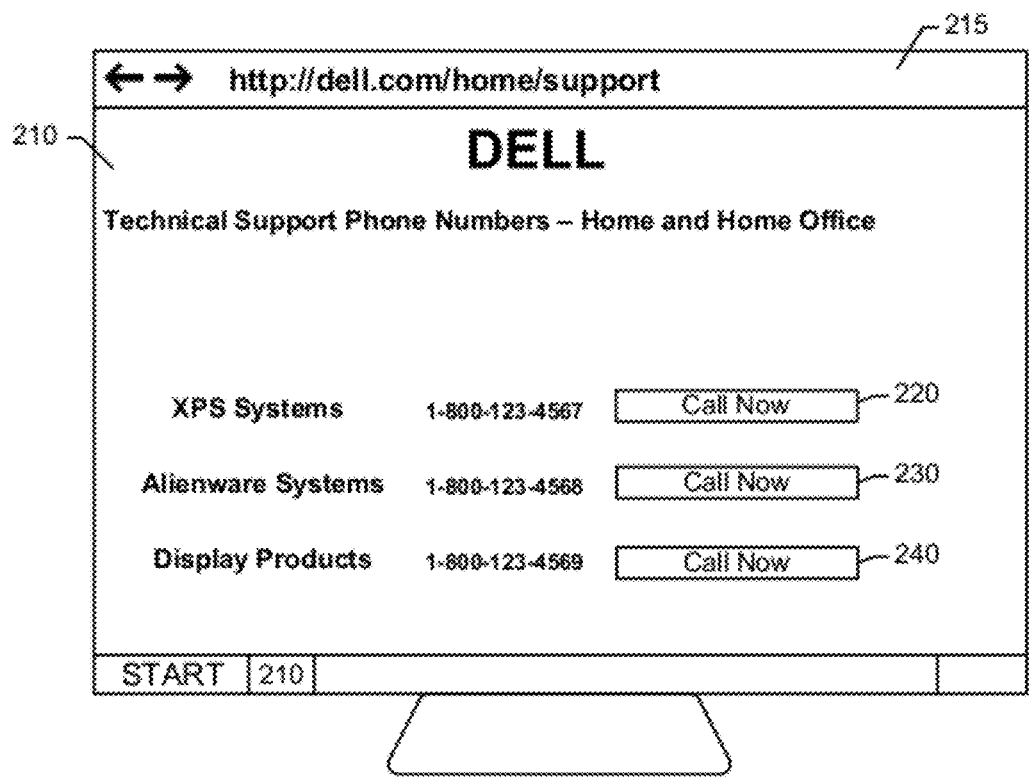
FIG. 2 illustrates a display of the information handling system of FIG. 1 showing another specific embodiment of the present disclosure.

FIG. 2 shows a web page 210 displayed by the web browser 111 at the personal computer 110 of FIG. 1 in accordance with a specific embodiment of the present disclosure. Browser 111 displays a web page specified by a Universal Resource Locator (URL) 215. The web page 210 is similar to a conventional customer support page, providing customer support telephone numbers corresponding to various products or services. In addition, the web page 210 includes Call Now buttons 220, 230, and 240. In an embodiment, a softphone application or applet can be launched in response to the user selecting one of the Call Now buttons. A softphone is a software application for making telephone calls over the Internet. If the voice communication routing system 121 has previously determined a sufficient amount of information to route the user's call to a desired customer support representative queue, the softphone call can be initiated immediately and the user can begin conversing with a representative that is most qualified to provide the identified support.

Figure 3:
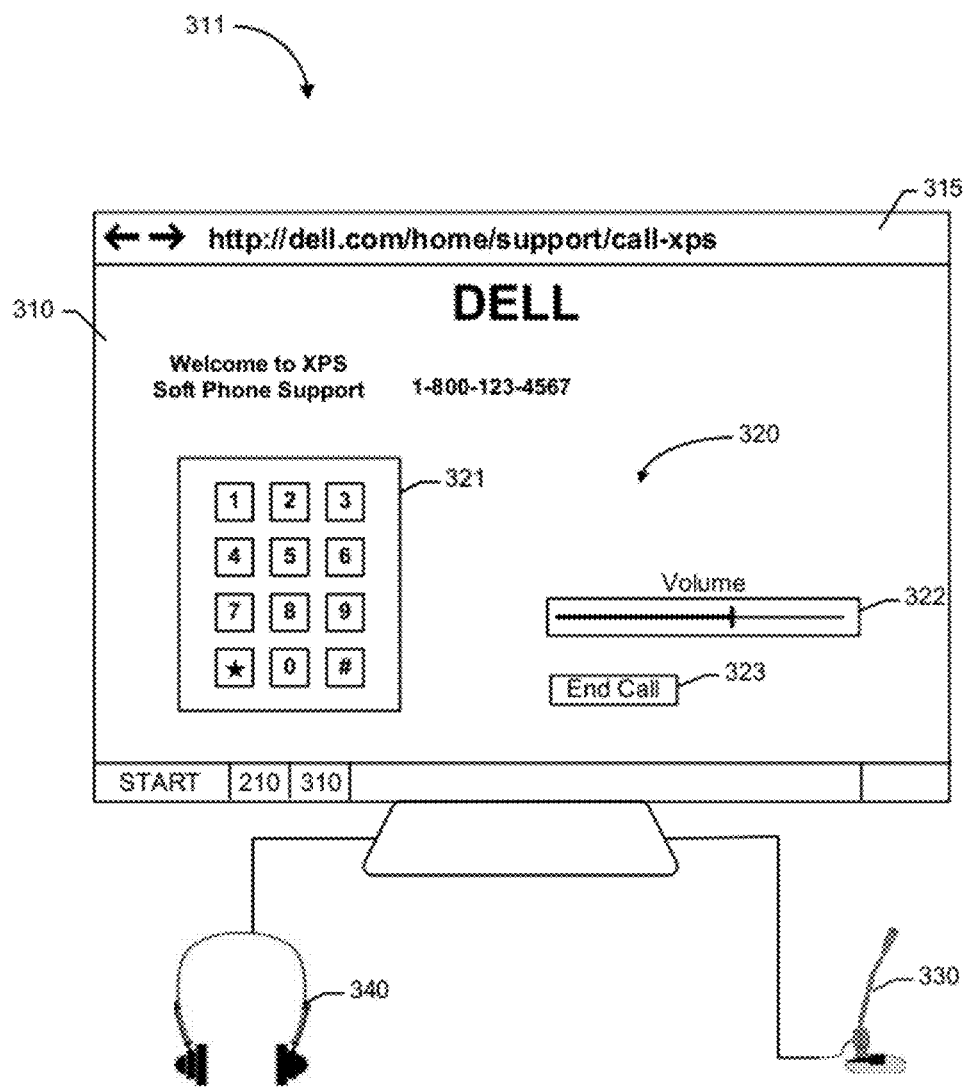
FIG. 3 illustrates the display showing another specific embodiment of the present disclosure.

FIG. 3 shows a web page 310 displaying a softphone 320 in accordance with a specific embodiment of the present disclosure. Softphone 320 is launched in response to selection of a Call Now button, such as the Call Now button 220 of FIG. 2. The softphone 320 can be configured to operate with a microphone 330 and a speaker or a headset 340 that is connected to the customer's personal data device. Alternatively, the softphone application 320 can be configured to operate with a Universal Serial Bus (USB) compliant phone-like appliance that is connected to the computer via a USB interface, or another type of speaker/microphone device. In an embodiment, the softphone 320 user interface includes a numeric keypad 321 similar to that present on a conventional telephone. The user interface may include additional display items to control and configure the smartphone application, such as a volume control 322 and an End Call button 323. In the event that the voice communication routing system has not yet compiled sufficient information concerning the user's intent, the system can solicit further information from the user. For example, an Interactive Voice Response (IVR) system may request additional information from the user, posing questions to which the user may respond by speaking into the microphone 330 or by using the numeric keypad 321. Once the system has gathered sufficient information, the user's call can be routed to the most appropriate service representative queue.

In an embodiment the softphone 320 can be displayed within a new browser window for URL 315, as shown in FIG. 3. In another embodiment, the softphone 320 can be an applet displayed at a dedicated window autonomous from the browser, such as a pop-up window. In still another embodiment, the softphone 320 can be displayed at the originally displayed web page 210. Furthermore, additional or intermediate pages can be displayed prior to establishing a call. For example, one or more pages can be displayed for the purpose of installing and configuring software, acquiring additional information from the customer, validating collected customer information, and the like.

Prior to initiating the call to customer service, the voice communication routing system 121 can determine whether the user's computer is properly configured to support the softphone application. For example, the routing system can determine whether the user's computer includes a prerequisite microphone and headphone/speaker equipment. In addition, the routing system can determine if the other software needed to implement the softphone application is installed and properly configured. For example, the softphone application may utilize Flash™ or Java™ software, which may need to be downloaded, installed, and configured at the user's computer. In an embodiment, information handling system can include integrated or pre-installed software, such as HTML5 or another device specific software application that is configurable to support a smartphone application. Configuration of the softphone application may include adjusting the volume of sound provided to the user's headphones, adjusting gain (amplification) applied to signals received at the user's microphone, and the like. One skilled in the art will appreciate that the softphone application 320 can be implemented using another application program or protocol that supports voice communication. For example, an information handling system can support one or more standard or proprietary device specific software applications, including operating systems, application programming interfaces, and the like. Furthermore, the web page 210 and the web page 310 can represent another type of display interface capable of displaying a Call Now button and executing a softphone application. For example, a television device can display a Call Now button and provide a softphone application.

FIG. 4 shows examples of information that the voice communication routing system 121 of FIG. 1 can use to select an appropriate service representative queue in a specific embodiment of the present disclosure. Table 400 includes a first column listing routing variables (variable names) and a second column listing unique values that can be associated with each corresponding routing variable. For example, row 401 includes a variable name "Unique Identifier," which may be associated with a first value "###" or a second value "Unset." An organization may utilize a Unique Identifier number to associate a customer, account, product, or a specific individual device with information that the voice communication routing system 121 can use to select a preferred recipient for a call. For example, a computer manufacturing company can assign a Unique Identifier, such as a serial number, to each computer or component thereof that is sold. The company can maintain an information database that associates the Unique Identifier with the identity of the purchaser of the item, hardware or software configuration of the item, support history associated with the purchaser, and the like. The information associated with the Unique Identifier can be used to guide the selection of a service representative or queue that is best qualified to provide support for the specific product, and some or all of the information can be provided to the customer support representative automatically by the call routing system so that the representative can quickly address the customer's request. If the Unique Identifier routing variable is not known or is otherwise not applicable, the variable may be assigned the value of Unset.

An organization may chose to organize support representative personnel based on their particular expertise. A customer's call can be routed to an appropriate service representative queue based on information collected by the routing system 121. In other words, the routing system 121 can classify a caller based on one or more parameters. For example, row 402 at table 400 includes a variable name "Caller Type," which may be associated with one of a set of values including "Business," "Consumer," or "Unset." The routing system 121 can determine a value to be associated with the Caller Type variable based on the particular web page to which a user has navigated, based on a menu item selected by a user, in response to a prompt displayed at a web page, based on a Unique Identifier, or by another method. If the user type has not yet been determined, a value of Unset may be assigned to the Caller Type variable name. In an embodiment, each variable name can be associated with a default value that can be used to route a call. For example, if the Caller Type has not been determined (value is Unset), the routing system 121 can be configured to categorize the user as a consumer based on a default value assigned to the variable Caller Type, and route the call accordingly.

Another criterion that an organization may find useful for routing customer support calls is a type of product. Row 403 includes a routing variable "Product," which can be assigned a value of "Desktop PC," "Notebook PC," "Television," or "Unset." The Product routing variable can be automatically assigned a value based on the web page currently displayed by the user's web browser, based on the user's navigation history, based on a browser cookie, based on other information, or a value can be determined based on a response by the user to a prompt. A softphone call can be routed to an appropriate representative queue based on the value associated with the Product variable. As described above, the Product variable name can be assigned a value of Unset to indicate that the intent of the user has not yet been determined, in which case a call can be routed based on a default value. For example, a call may be routed to a service representative responsible for Desktop PC devices if the value of the Product routing variable is Unset.

Row 404 at table 400 includes a routing variable "Issue Category," which can be assigned a value of "Sales," "Lease," "Order Status," or "Unset." Row 405 includes a routing variable "Region," which can be assigned a value of "North America," "Canada," "European Union," or "Unset." The number of routing variables and the number of corresponding values that are supported by a particular routing system can vary based on the size of the organization, the degree of specialization required of a service representative, or based on other factors. The routing variables and values included at the table 400 are merely examples of criteria that can be evaluated to advantageously route a softphone call to an optimal service representative queue. For example, a routing variable "Agent Extension" can be assigned a value indicating a telephone number of a specific service representative, such as a representative that has had previous interaction with a customer, and a call can be routed with the Agent Extension variable heavily or exclusively weighted. The likelihood that a support representative can promptly address a customer's needs may be increased if the customer's intent can be determined with greater precision. Furthermore, a customer's satisfaction with the service may be improved if the call can be routed to an appropriate service representative queue with minimal delay and with minimal prompting for additional customer information. Accordingly, the voice communication routing system 121 attempts to automatically determine information about a user's intent without directly querying the user for that information.

The routing system 121 may determine other information about a user that is not specifically used to route a call to an appropriate service representative queue, but can nonetheless be used by a support representative to better serve a customer. This information can be maintained as variable names having corresponding values. For example, a variable "Customer Name" can be assigned a value that is the name of the customer, and this information can be forwarded to the customer support representative when a call is initiated. Additional supplemental information can include a telephone number associated with the customer placing the softphone call, prior service records associated with the customer, account information, diagnostic information obtained from the customer's device or from business records, and the like. In an embodiment, a Unique Identifier associated with a caller can be used to retrieve information about the caller or a specific device, and the information can be forwarded to a service representative.

In an embodiment, some or all of the routing variables and additional information can be forwarded to the customer support representative as a string of name-value pairs. For example, the routing system 121 can assemble an information string:

Unique Identifier=12345& Caller Type=Business&Product=Unset

The information string can be provided to a selected service representative and the information can be formatted and displayed for convenient reference by the representative. The information string can include some or all of the routing variables and some or all of the information variables that are maintained by the routing system 121. In an embodiment, the name-value information string can be transmitted from one server, such as the web server 120 of FIG. 1, to another server that is responsible for facilitating routing of calls by appending the information string to a URL using HTTP POST protocol. In another embodiment, some or all of the routing information and additional information can be stored at a database for later retrieval.

Figure 5:
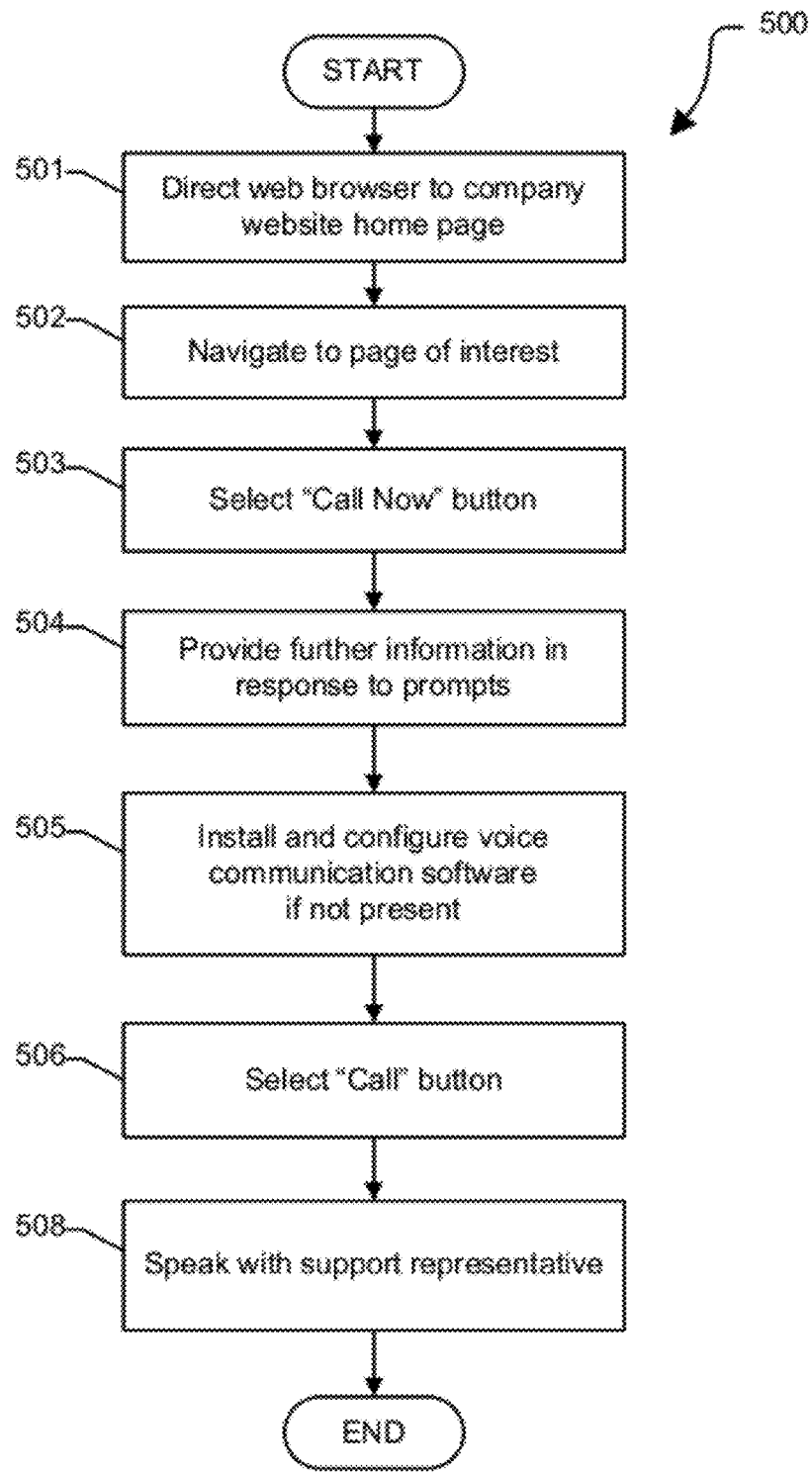
FIG. 5 is a flow diagram illustrating a method for providing softphone based customer support in accordance with a specific embodiment of the present disclosure.

FIG. 5 shows how a user can speak with a customer support representative using a softphone application in accordance with a specific embodiment of the present disclosure. A method 500 begins at block 501 where a user directs their web browser to a web page hosted by a company of interest to the user. The flow proceeds to block 502 where the user navigates to a particular web page using hyperlinks, menu options, or the like. The flow proceeds to block 503 where the user clicks on a Call Now button. The flow proceeds to block 504 where the user can provide additional information about the type of service that they desire. In an embodiment, a call routing system such as the voice communication routing system 121 of FIG. 1, may have already determined enough information about the user's intent to route the call to an appropriate service representative queue and therefore additional information is not required.

The flow proceeds to block 505 where voice communication application software is installed and configured at the user's computer if such an application is not already present. In addition, the website software can be configured to verify that the user's computer is equipped with a microphone and speakers or headphones, and to assist the user with calibrating their sound parameters such as speaker volume and microphone gain. For example, a website software application can request that the user speak into their microphone and to adjust a speaker volume using a slider displayed at the webpage. Once the softphone application is properly configured, the user can click on a Call button, which initiates a softphone connection between the user and the support representative that has been determined by the routing system based on the previously acquired information. The flow proceeds to block 508 where the user can speak with a live customer support representative. The method 500 illustrates only one example scenario in which a user may establish a softphone connection with a customer support representative, wherein a representative queue has been specifically selected based on information automatically acquired by the call routing system.

Figure 6:
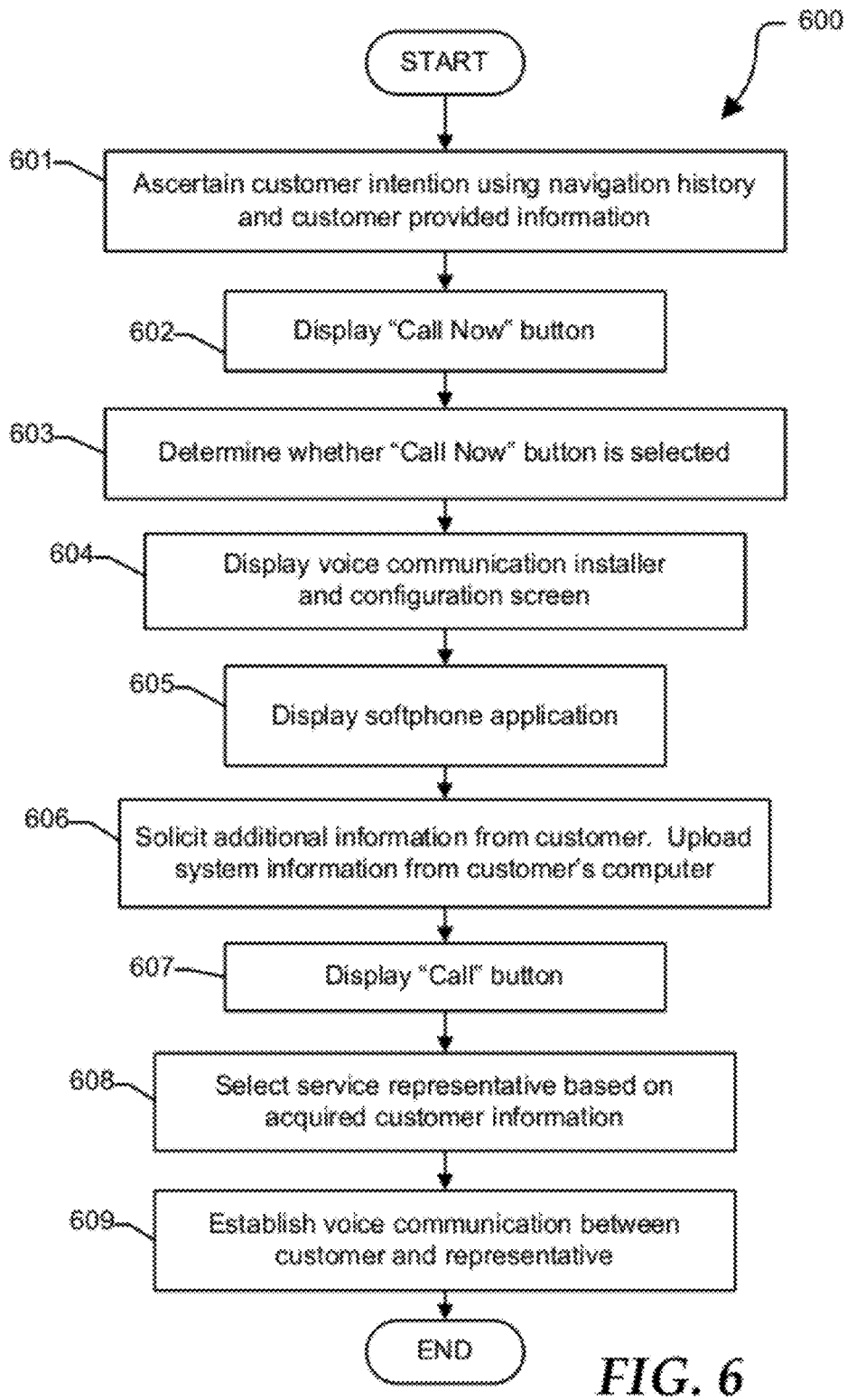
FIG. 6 is a flow diagram illustrating another method for providing softphone based customer support in accordance with a specific embodiment of the present disclosure.

FIG. 6 shows how an organization can provide softphone based customer support using the voice communication routing system 121 of FIG. 1 in accordance with a specific embodiment of the present disclosure. A method 600 is similar to the method 500, however the method is presented from the point of view of an organization's web server and an associated call routing system, such as the voice communication routing system 121 of FIG. 1. The method 600 begins at block 601 where a web server determines information about an intent of a user who is browsing an organization's web site by monitoring the navigation history of the user and, optionally, prompting the user for additional information. As described above, other means can be employed to help ascertain the user's intent. For example, browser cookies generated by a website can provide information about recent or previous visitations by the user. Other information can include web site access-registration information, service or product codes previously entered at the website by the user, information retrieved from the user's computer, and the like.

The flow proceeds to block 602 where a Call Now Button can be displayed on the web page that is presently being viewed by the user. In an embodiment, display of the Call Now button can be conditional based on one or more factors. For example, softphone based customer support can be restricted to a specific class of user, such as a customer possessing a product support contract. For another example, a web server can be configured to display a Call Now button only after determining that a call center queue or wait time is sufficiently short. Another criterion for determining whether to display a Call Now button can be a network bandwidth presently available between the customer and equipment administering the call center. For example, a minimum data rate of 64 Kbs may be required to provide acceptable sound quality of a softphone voice communication system. For still another example, an organization may chose to provide softphone based customer support based on strategic business interests, call center backlog, and the like.

In the event that the customer's computer is not equipped with a microphone, or the computer is otherwise not configured to support a voice communication application, a telephone number can be displayed at the customer's computer and the customer can place a conventional telephone call for assistance. In an embodiment, a unique customer identification code can be displayed at the customers browser display. The customer identification code can be associated with customer information that has been previously acquired by the call routing system. In the event that a customer must utilize a conventional telephone call to speak with a representative, the customer can recite the identification code to a support representative, who can use the number to immediately receive the stored customer information. Thus, the support representative need not take time to collect information about the caller during the telephone conversation.

The method 600 continues at block 603 where the web server determines that a user has clicked the Call Now button, in which case the flow proceeds to block 604 where the server displays a web page to facilitate installing and/or configuring a softphone application program to operate at the customer's computer, as described above. The flow proceeds to block 605 where a softphone application user interface is displayed, such as the user interface shown at FIG. 3. The flow proceeds to block 606 where the call routing system 121 can optionally solicit additional information from the customer. For example, if further information is needed to identify an appropriate service representative queue, the customer can be presented with an automated IVR system wherein the customer responds to vocal queries by clicking corresponding numerical buttons at a keypad displayed by their web browser. In addition, the web server can optionally retrieve system information from the customer's computer. For example, the call routing system 121 can retrieve a Unique Identifier that is stored at the customer's computer and use the code to fetch product or customer information from an information database maintained at the organization. Once the call routing system 121 has collected enough information to properly route the customer's call, the flow proceeds to block 607 where a Call Now button is displayed at the customer's browser. The flow proceeds to block 608 where the call routing system selects a preferred customer support representative queue based on the previously acquired information. In addition, the server can forward some or all of the acquired customer information to a representative at the selected queue. The flow proceeds to block 609 where a communication channel is established between the customer and the representative using the softphone application program. After completing the call, a follow-up email can be sent to the customer to provide a record of the call and specifics like a session identification or ticket number, to identify the agent or account manager that handled the call, or to inquire whether the customer is satisfied with the service. Moreover, the email can be provided with a Call Now button having a customized URL or other path such that the recipient may reestablish voice contact with the same agent.

A situation may arise where the customer is unable to utilize a softphone application or simply prefers to speak with a service representative using a conventional telephone. For example, the customer's computer may not be equipped with a microphone or headset, or the customer may be intimidated by or otherwise uncomfortable with the softphone application. In such a situation, the customer can be offered an option to receive a conventional telephone call initiated by the telecom infrastructure and matched to the proper queue or agent. As described above, the voice communication routing system 121 can automatically identify the customer's specific intent and identify an appropriate representative. In an embodiment, the routing system 121 can prompt the customer for a telephone number and forward the telephone number to the selected representative along with other acquired customer information that the representative can use to efficiently satisfy the customer's needs. In another embodiment, a call-back using a conventional telephone may be preferred in the event that all appropriate representatives are presently busy and an anticipated wait time exceeds a predetermined interval. In still another embodiment, a customer can specify a desired time or date to receive a call from the system. In yet another embodiment, a Call Me button can be displayed at a web page adjacent to, or in place of, a Call Now button.

Because the customer support call is facilitated by a web browser or a similar device specific software application, interaction between a customer and a support representative can include more than voice communication using a softphone application. For example, a support representative can initiate display of information at the customer's computer, such as tutorial videos, options for downloading software or product documentation, pop-up display windows, and the like. Documents and other information can be transferred from the representative to the customer or from the customer to the representative using push/pull software applications available to the web browser. Alternative communication channels can be provided while a customer is connected with a service representative, such as text chat, email, and the like. For example, a caller can be provided with a telephone number and extension corresponding to the specific service representative to whom the caller is speaking In addition, targeted advertisements can be displayed at the customer's computer. During the time that a customer is connected with a support representative via the softphone application, various browser controls and hyperlinks may be disabled so that the customer cannot accidentally navigate away from the softphone application until the call is completed.

Much of the equipment and software infrastructure associated with a conventional call center can be leveraged to implement the call system disclosed herein. For example, an existing data center including packet session boarder controllers (SBCs), session initiation protocol (SIP) trunk services, automated call distributor (ACD) systems, voice portal systems, load balancers, and the like can be utilized without significant modification. For example, the addition of Flash Media Gateway (FMG) servers or similar devices can provide a bridge between existing web servers and the call data center.

Figure 7:
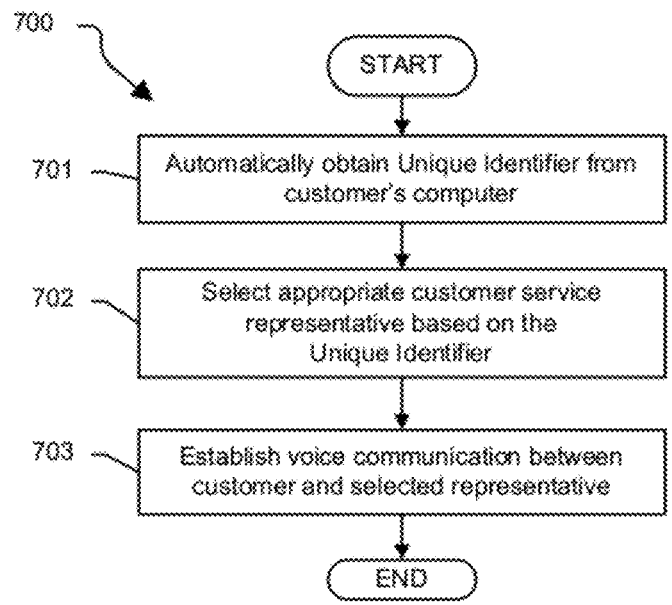
FIG. 7 is a flow diagram illustrating still another method for providing softphone based customer support in accordance with a specific embodiment of the present disclosure.

FIG. 7 shows a method 700 for selecting a preferred customer support representative queue to receive a softphone call based on automatically determining a Unique Identifier in accordance with a specific embodiment of the present disclosure. Method 700 begins at block 701 where a call routing system automatically obtains a Unique Identifier from a customer's computer. For example, the voice communication routing system 121 of FIG. 1 associated with an organization's web site can be configured to initiate communication with a customer's computer for the purpose of retrieving a Unique Identifier, a device serial number, or the like. The Unique Identifier can serve as an index into an information database maintained by the organization, the database providing information about the customer's computer, information about the customer, and the like. For example, the information database can include specific model and configuration information, software installations, system driver version numbers, as well as personal information about the customer such as their name, address, phone number, service contract identification, and the like.

In an embodiment, the value of a Unique Identifier can be automatically retrieved from a customer's computer system by the routing system 121 using remote system management techniques. For example, the Windows operating system supports Windows Management Instrumentation (WMI), Windows Remote Assistance, ActiveX protocols, and other communication protocols for retrieving information from a user's computer. In another embodiment, an information handling device supporting a Unified Extensible Firmware Interface (UEFI) may provide mechanisms whereby platform firmware can be directly accessed by an interface provided by the operating system associated with the customer's computer. It will be appreciated by those skilled in the art that much of the information stored at the organization's database may be retrieved directly from the customer's computer. Furthermore, an organization may connect with a customer's computer to update and verify information maintained at the organization's database.

Having determined the customer's Unique Identifier, the flow proceeds to block 702 where an appropriate customer service representative queue can be selected based on the retrieved code. For example, the Unique identifier may be a service code can be used to differentiate between a private consumer and a corporate account and route the softphone call accordingly. For another example, service representatives may be classified based on their experience or training with particular products, and a support representative best qualified to efficiently provide support to the customer can be selected based on the service code. Once a preferred representative queue has been selected, the flow proceeds to block 703 where voice communication can be established between the customer and a representative associated with the selected queue using a softphone application running at the customer's web browser.

Figure 8:
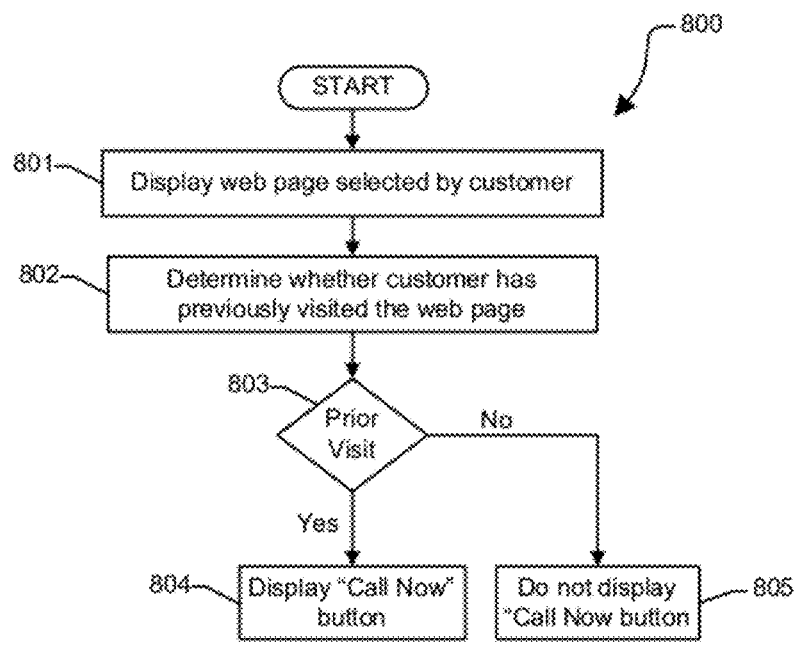
FIG. 8 is a flow diagram illustrating a method for conditionally providing a customer with an opportunity to initiate a softphone call with a customer support representative in accordance with a specific embodiment of the present disclosure.

FIG. 8 shows a method 800 for conditionally providing a customer with an opportunity to initiate a softphone call with a customer support representative in accordance with a specific embodiment of the present disclosure. Method 800 begins at block 801 where a customer navigates their web browser to a desired web page and a web server displays the selected web page at the customer's browser application. The flow proceeds to block 802 where the web server determines whether the customer has previously visited the web page. For example, the voice communication routing system 121 can evaluate the customer's navigation history, such as by interrogating browser cookies stored at the customer's computer, and determine whether the customer has previously viewed the web page presently displayed. If it is determined that the customer has previously viewed the web page, the flow proceeds from the decision block 803 to block 804 where a Call Now button is displayed at the web page currently being viewed by the customer. The customer can click the Call Now button to initiate a softphone based call to a customer service representative. If it is determined that the customer has not previously viewed the web page, the flow proceeds to block 805 where a Call Now button is not displayed at the web page currently being viewed by the customer.

In this particular example, the navigation history of the customer is used to indicate the degree of interest that the customer may possess, or perhaps a frustration level, having failed to reach a web page to satisfy their needs. Furthermore, a Call Now button can be conditionally displayed based on other criteria. For example, display of a Call Now button may be suppressed if the routing system 121 determines that a call center queue exceeds a predetermined length, so as not to frustrate the customer with an excessive call hold time. For another example, a Call Now button can be displayed only after determining that a customer viewing the web page possesses a premium service contract. An organization may conditionally display a Call Now button based on strategic business interests, for example a promotion or sale of a particular product. For still another example, the call routing system 121 can determine whether the customer's computer hardware, software, or communications network can support a softphone application. For example, the routing system 121 can determine whether the customer's network connection can support a transmission rate deemed necessary to provide acceptable sound quality. In an embodiment, the routing system 121 can determine whether the customer's computer is equipped with a camera and display a Call Now button accordingly.

As described above, the routing system 121 can automatically acquire significant amounts of information concerning the customer and their intentions. Additional information useful for determining the customer's intent can be acquired using directed questions or prompts presented to the customer. The routing system 121 can provide these prompts to the customer using text messages, synthesized voice messages, prerecorded voice messages, a menu system, and the like. Similarly, the routing system 121 can include voice recognition capabilities to interpret customer responses to the prompts. This acquired information can be evaluated and used by the routing system to determine whether a Call Now button should be displayed at the web page presently displayed by the customer. For example, the Call Now button can be withheld until the routing system 121 has accumulated a prerequisite amount of information about the customer. In an embodiment, having provided a Call Now button, and in response to activation of the Call Now button by a customer, some or all of the acquired information can be used to route a customer's call to an appropriate support representative queue. In another embodiment, some or all of the acquired information can be forwarded to a selected representative.

Figure 9:
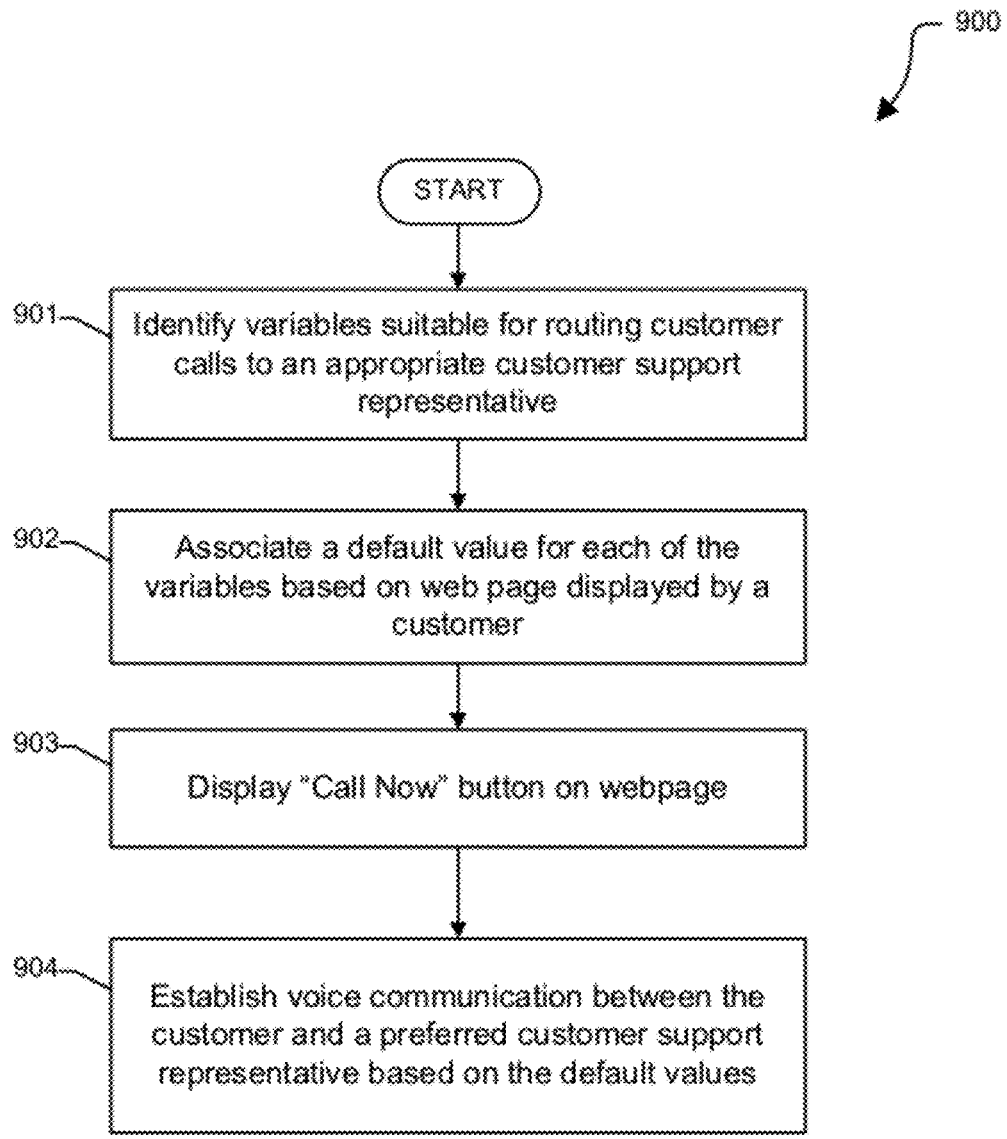
FIG. 9 is a flow diagram illustrating a method for assigning default values to a set of routing variables in accordance with a specific embodiment of the present disclosure.

FIG. 9 shows a method 900 for assigning default values to a set of routing variables in accordance with a specific embodiment of the present disclosure. Method 900 begins at block 901 where routing variables suitable for determining how to route a customer's softphone call are identified. As describe above with reference to FIG. 4, each of a set of variables can be associated with one of a set of respective values. In the event that a value for a particular variable has not been established, a temporary or default value for that variable can be assigned for the purpose of routing a softphone call to a preferred customer support representative queue. At block 902 a default value can be associated with each routing variable based on a web page currently displayed by a customer. For example, if a customer is currently displaying a web page featuring consumer desktop gaming computers, the routing system 121 can assign values to each of a set of routing variable assignments based on the displayed website:

Caller Type=Consumer
Product=Desktop
Product category=High Performance
Issue Category=Sales In an embodiment, the routing system 121 can differentiate between a variable value that has been explicitly determined and a variable value that has been deduced based on anecdotal means. For example, a name-value pair can include syntax cues that distinguish between information provided directly by a customer or obtained by means of a Unique Identifier and interpreted or default values.

The flow proceeds to block 903 where a Call Now button is displayed at the webpage currently displayed by the customer. At block 904 voice communication can be established between the customer and a preferred customer support representative, the representative associated with a support queue selected based on the value of one or more routing variables. By automatically determining some or all of a customer's intentions or needs, a service representative can be selected to receive the softphone call that is best qualified to address those needs. As a result, the customer's needs are addressed efficiently and with greater satisfaction.

Figure 10:
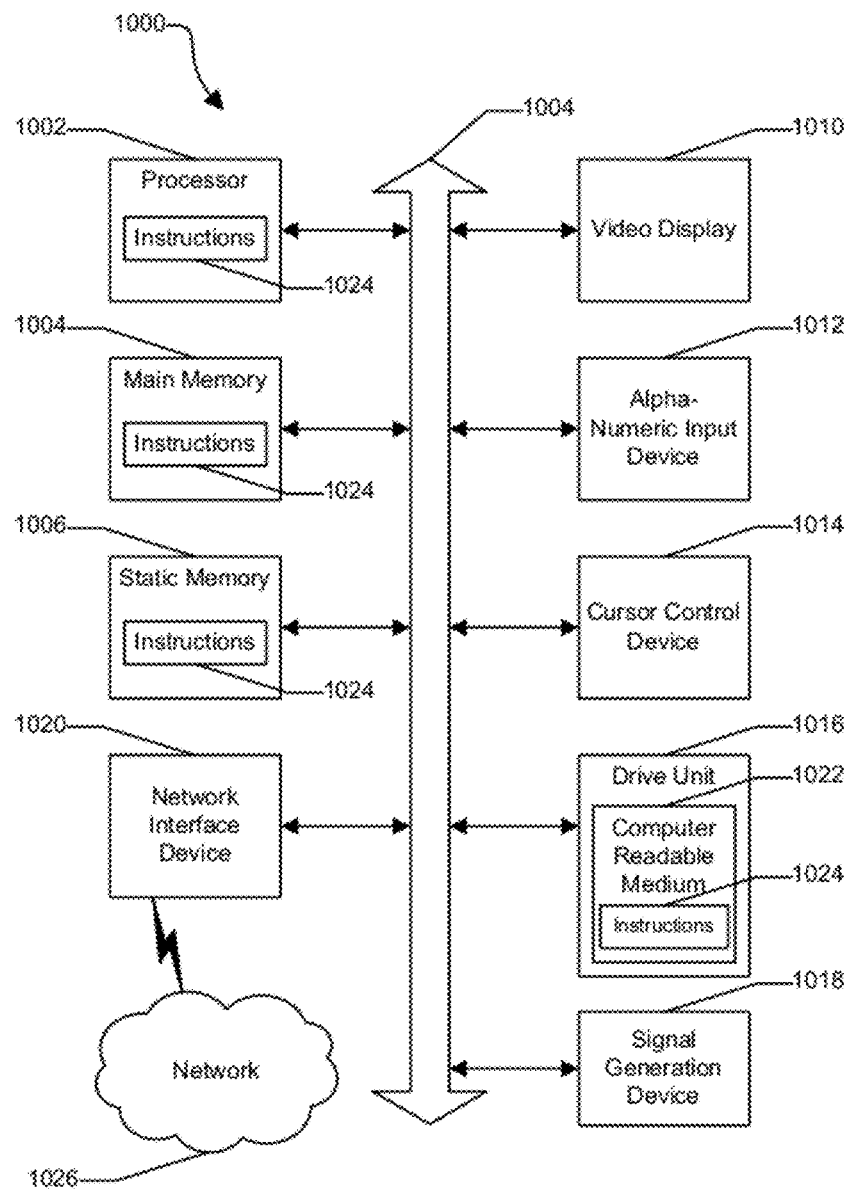
FIG. 10 is a block diagram illustrating an information handling system capable of administering each of the specific embodiments of the present disclosure.

FIG. 10 shows an information handling system 1000 capable of administering each of the specific embodiments of the present disclosure. The information handling system 1000 can represent the personal computer 110 of FIG. 1, the web server 120, or another data processing device associated with the voice communication routing system 121. The information handling system 1000 may include a processor 1002 such as a central processing unit (CPU), a graphics processing unit (GPU), or both. Moreover, the information handling system 1000 can include a main memory 1004 and a static memory 1006 that can communicate with each other via a bus 1008. As shown, the information handling system 1000 may further include a video display unit 1010, such as a liquid crystal display (LCD), an organic light emitting diode (OLED), a flat panel display, a solid state display, or a cathode ray tube (CRT). Additionally, the information handling system 1000 may include an input device 1012, such as a keyboard, and a cursor control device 1014, such as a mouse. The information handling system 1000 can also include a disk drive unit 1016, a signal generation device 1018, such as a speaker or remote control, and a network interface device 1020. The information handling system 1000 can represent a server device whose resources can be shared by multiple client devices, or it can represent an individual client device, such as a desktop personal computer.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a CPU or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The information handling system 1000 can include a set of instructions that can be executed to cause the computer system to perform any one or more of the methods or computer based functions disclosed herein. The computer system 1000 may operate as a standalone device or may be connected such as using a network, to other computer systems or peripheral devices.

In a networked deployment, the information handling system 1000 may operate in the capacity of a server or as a client user computer in a server-client user network environment, or as a peer computer system in a peer-to-peer (or distributed) network environment. The information handling system 1000 can also be implemented as or incorporated into various devices, such as a personal computer (PC), a tablet PC, a set-top box (STB), a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single information handling system 1000 is illustrated, the term "system" shall also be taken to include any collection of systems or sub-systems that individually or jointly execute a set, or multiple sets, of instructions to perform one or more computer functions.

The disk drive unit 1016 may include a computer-readable medium 1022 in which one or more sets of instructions 1024 such as software, can be embedded. Further, the instructions 1024 may embody one or more of the methods or logic as described herein. In a particular embodiment, the instructions 1024 may reside completely, or at least partially, within the main memory 1004, the static memory 1006, and/or within the processor 1002 during execution by the information handling system 1000. The main memory 1004 and the processor 1002 also may include computer-readable media. The network interface device 1020 can provide connectivity to a network 1026, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1024 or receives and executes instructions 1024 responsive to a propagated signal, so that a device connected to a network 1026 can communicate voice, video or data over the network 1026. Further, the instructions 1024 may be transmitted or received over the network 1026 via the network interface device 1020.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Information handling systems provide fundamental services in nearly every aspect of business. For example, information handling systems can be used by businesses to automate manufacturing processes, implement product design tools, support marketing and sales, and the like. Information handling systems, such as personal computers, mobile communication devices, and the like, are equally prevalent in our personal lives. It is only natural that an increasing amount of commerce is being conducted via information handling systems. Today, an internet web site may provide the primary interface between a business and their customers. While a great deal of business activity can be automated, there will always remain the need for customers to speak directly with a personal representative of an organization. Electronic mail correspondence may be sufficient in many cases, but the highest quality of customer service is typically provided by direct communication with a representative via a telephone. However, the cost and logistics of maintaining human support personnel at a large business or corporation can be considerable. As a result, businesses have adopted one or more practices to address this problem. One solution is to out-source customer support responsibility to a customer service call-center, which is often located overseas to reduce manpower costs. Another common solution is to transfer customer calls to a recording system or to another form of automated reception service.

The systems and methods disclosed herein provide significant benefits when compared to conventional techniques. For example, in existing enterprises, customer calls are typically routed to an appropriate customer support representative only after soliciting information from the customer to determine the nature of the customer's intention. For example, customer calls may be answered by a pre-recorded message system configured to prompt the customer to select specific options from a menu. An IVR system may allow a user to select from a predetermined set of options by speaking words, simple phrases, or numbers, or by pressing keypad numbers on their telephone that correspond to desired options. The customer's call can then be routed to a human operator or to a voice mail box based on the customer's responses to the options provided by the automated system. Unfortunately, this process can be both tedious and ultimately unsatisfactory to the customer. For example, in a typical business a customer may be expected to provide responses to approximately seven individual questions before the IVR system can adequately determine the customer's intent and subsequently route the customer's call to a representative best able to provide satisfactory support.

There are considerable benefits of the disclosed system over current practices. The traditional IVR selection procedure can be eliminated or the number of questions required to fully determine the customer's intent can be significantly reduced because this information can be derived through multiple techniques prior to the time that a customer initiates a call to a support representative. By quickly directing the customer to an ideal representative, the customer's experience and satisfaction is greatly improved. Furthermore, by reducing the average hold time (AHT) and by increasing the likelihood of providing first call resolution (FCR) of the customer's needs, costs associated with customer service can be reduced.

Placement of a Call Now button is not limited to the body of web page or display interface provided by a device specific software application. For example, a Call Now button can be incorporated at an Internet search engine, at a social media site, within a mobile device application, banner advertisements or pop-up display windows, Email documents and Email viewers, interactive television programs, and the like. In response to selection of the Call Now button by a user, a call can be routed to a selected service representative based fully or in part on information determined by the voice communication routing system 121.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of routing a voice communication from a web page to one of a plurality of queues, comprising: determining a plurality of variables for routing the voice communication, each of the variables having at least one first value; assigning a default value to each variable for the web page so that the voice communication can be routed to one of the queues regardless of whether the first value has been ascertained; and including within a data structure for the variables syntax cues that distinguish between information directly provided by a customer visiting the web page and default values.

2. The method of claim 1 wherein the first value is ascertained based on user interaction with the web page.

3. The method of claim 1 further comprising determining that the voice communication cannot be routed successfully, and displaying a telephone number.

4. A method of routing a voice communication from a personal computer to one of a plurality of queues, comprising: presenting a web page having a plurality of variables for routing the voice communication, each of the variables having at least one first value; and presenting a softphone running on the web page, the softphone placing the voice communication so that the voice communication can be routed to one of the queues regardless of whether the first value has been ascertained; and including within a data structure for the variables syntax cues that distinguish between information directly provided by a customer visiting the web page and default values.

5. The method of claim 4 wherein the webpage is HTML encoded.

6. The method of claim 4 wherein the webpage is displayed within a browser.

7. The method of claim 1 further comprising presenting to a customer visiting the web page an option of being called by a conventional telephone call or of placing a call through a softphone.

8. The method of claim 4 further comprising: sending the customer a follow-up email at the end of the voice communication, the follow-up email containing an identification of a representative that handled the voice communication.

* * * * *